(12) United States Patent
Enomoto et al.

(10) Patent No.: US 10,837,348 B2
(45) Date of Patent: Nov. 17, 2020

(54) THERMAL MANAGEMENT DEVICE FOR VEHICLE

(71) Applicant: DENSO CORPORATION, Kariya (JP)

(72) Inventors: Norihiko Enomoto, Kariya (JP); Yoshiki Kato, Kariya (JP); Nobuyuki Hashimura, Kariya (JP); Kengo Sugimura, Kariya (JP); Koji Miura, Kariya (JP); Keigo Sato, Kariya (JP); Ariel Marasigan, Kariya (JP)

(73) Assignee: DENSO CORPORATION, Kariya (JP)

( * ) Notice: Subject to any disclaimer, the term of this patent is extended or adjusted under 35 U.S.C. 154(b) by 151 days.

(21) Appl. No.: 16/078,539

(22) PCT Filed: Jan. 27, 2017

(86) PCT No.: PCT/JP2017/002840
§ 371 (c)(1),
(2) Date: Aug. 21, 2018

(87) PCT Pub. No.: WO2017/145638
PCT Pub. Date: Aug. 31, 2017

(65) Prior Publication Data
US 2019/0078497 A1    Mar. 14, 2019

(30) Foreign Application Priority Data
Feb. 23, 2016 (JP) .................. 2016-032051

(51) Int. Cl.
*F01P 11/02* (2006.01)
*B60H 1/08* (2006.01)
(Continued)

(52) U.S. Cl.
CPC .............. *F01P 11/028* (2013.01); *B60H 1/00* (2013.01); *B60H 1/08* (2013.01); *B60K 11/04* (2013.01);
(Continued)

(58) Field of Classification Search
CPC ........ F01P 11/028; F01P 11/029; F01P 11/06; F01P 3/20; F01P 7/16; F01P 2011/066; B60H 1/00; B60H 1/08; B60K 11/04
(Continued)

(56) References Cited

U.S. PATENT DOCUMENTS

2015/0258875 A1*  9/2015  Enomoto ................ B60L 1/003
                                                                165/104.31

FOREIGN PATENT DOCUMENTS

| EP | 2876274 A1 | 5/2015 |
|----|------------|--------|
| JP | H10266856 A | 10/1998 |
| JP | H11350956 A | 12/1999 |

OTHER PUBLICATIONS

Uponor commercial piping systems PDF (dates to 2013 per wayback machine per webpage: web.archive.org/web/2013*/https://www.uponorpro.com/~/media/Extranet/Files/manuals/CommPipingEngineer_RefGuide_CM003_0613CA_535142.aspx?sc_lang=en&version=061720131229).*

* cited by examiner

*Primary Examiner* — Joel M Attey
(74) *Attorney, Agent, or Firm* — Harness, Dickey & Pierce, P.L.C.

(57) ABSTRACT

A thermal management device for a vehicle includes heat medium circuits, a reserve tank, and a connector. The heat medium circulates through the heat medium circuits separately. The reserve tank is configured to separate an air bubble contained in the heat medium from the heat medium. The connector allows the reserve tank to come in communication with the heat medium circuits selectively. As such, an occurrence of the heat loss in the degassing performed in the reserve tank can be suppressed with the thermal management device for a vehicle including the heat medium circuits.

20 Claims, 5 Drawing Sheets

(51) Int. Cl.
*B60K 11/04* (2006.01)
*F01P 11/06* (2006.01)
*F01P 3/20* (2006.01)
*F01P 7/16* (2006.01)
*B60H 1/00* (2006.01)

(52) U.S. Cl.
CPC .................. *F01P 3/20* (2013.01); *F01P 7/16* (2013.01); *F01P 11/029* (2013.01); *F01P 11/06* (2013.01); *F01P 2011/066* (2013.01)

(58) Field of Classification Search
USPC .......................................................... 165/41
See application file for complete search history.

THERMAL MANAGEMENT DEVICE FOR VEHICLE

CROSS REFERENCE TO RELATED APPLICATIONS

This application is a U.S. National Phase Application under 35 U.S.C. 371 of International Application No. PCT/JP2017/002840 filed on Jan. 27, 2017 and published in Japanese as WO/2017/145638 A1 on Aug. 31, 2017. This application is based on and claims the benefit of priority from Japanese Patent Application No. 2016-032051 filed on Feb. 23, 2016. The entire disclosures of all of the above applications are incorporated herein by reference.

TECHNICAL FIELD

The present disclosure relates to a thermal management device for a vehicle.

BACKGROUND ART

As a conventional technique, Patent Literature 1 describes a cooling system provided with a plurality of cooling circuits. The conventional technique is provided with a supercharger cooling circuit and an engine cooling circuit.

In the conventional technique, a common reserve tank is connected to the supercharger cooling circuit and the engine cooling circuit. The common reserve tank performs pressure management in the supercharger cooling circuit and the engine cooling circuit and performs degassing for a coolant. The degassing for the coolant may mean removing air from the coolant by separating the coolant into gas and liquid.

PRIOR ART LITERATURE

Patent Literature

Patent literature 1: EP 2 876 274 A1

SUMMARY OF THE INVENTION

The following are reasons why the degassing for the coolant is necessary in the above conventional technique. The coolant may be referred to as the cooling water hereinafter. In order to maintain the cooling performance, the degassing is necessary at any time as needed, for example, after replacement of the cooling water, or for removing a very small amount of air bubbles (referred to as air hereinafter) that enters through a cooling pipe or air generated by liquid splash on the liquid surface of the reserve tank.

In particular, in a system having a high temperature, the cooling performance is largely deteriorated due to the air, which largely affects traveling of the vehicle.

In a case where a large flow rate is required (e.g., an amount of generated heat is large or a small temperature distribution is desired), when the air flows through the cooling circuits, cavitation is likely to occur with a core of the air. Accordingly, corrosion of pipes may accelerate, and the pump performance may deteriorate, which results in an insufficient flow rate of the cooling water.

In a cooling system provided with an air conditioning circuit, when the cooling water containing air therein flows into an air-conditioning heat exchanger of an air conditioner, an air trapping sound goes through an inside of a vehicle compartment, which gives an occupant an uncomfortable feeling. The air conditioning circuit is a cooling water circuit provided with the air-conditioning heat exchanger of the air conditioner. The air-conditioning heat exchanger is configured to perform a heat exchange between air supplied into the vehicle compartment and the cooling water.

In the above-described conventional technique, the reserve tank is configured to perform the degassing for the cooling water. However, since the common reserve tank is connected to the plurality of circuits, the cooling water flowing from the circuits are mixed with each other in the common reserve tank. As a result, heat loss may occur.

Thus, the supercharger cooling capacity in the supercharger cooling circuit may deteriorate, therefore the supercharging efficiency may deteriorate. In addition, the cooling and heating performance may deteriorate in the air conditioning circuit.

In particular, in a system that is provided with a high-temperature cooling water circuit through which high temperature cooling water circulates and a low-temperature cooling water circuit through which low temperature cooling water circulates, the heat loss may become extremely large. When the coolant flow rate is reduced in order to suppress the heat loss, the degassing efficiency may deteriorate.

Then, it may be considered to mount an individual reserve tank in each of the circuits. However, in a configuration in which the circuits are in communication with each other to exchange heat with each other using the cooling water, there may be an abnormality that a liquid surface may vary thereby causing an overflow of the cooling water from the reserve tank.

Thus, the inventors of the present disclosure have conducted a study for finding an appropriate piping in the plurality of circuits so that the degassing efficiency can be ensured in the configuration in which the common reserve tank is connected to the circuits.

That is, in the configuration in which a common reserve tank is connected to the plurality of circuits, gas-liquid separation can be completed by circulating the cooling water for a short time with a circuit at a relatively low position. However, with a circuit at a relatively high position, the cooling water is required to circulate in the common reserve tank longer for completing the gas-liquid separation.

In view of the foregoing points, the inventors have experimented and studied a technique in which a connection port of a path that is connectable to a reserve tank is disposed vertically above the reserve tank to naturally guide air to the reserve tank by gravity.

However, in the studies, workability in filling the cooling water drastically deteriorates because the cooling water is required to be supplied with a large flow rate for a long time. That is, in an actual vehicle, it is not realistic to align the heights of all cooling water circuits when considering ease of mounting thereof to the vehicle. As such, the performance of gas-liquid separation may not be improved sufficiently by changing a shape of the pipes.

In a configuration that includes a plurality of cooling circuits and performs cooling, heating, dehumidification heating, device cooling, and device heating in a vehicle at any time as needed, an object circuit for which the degassing is performed may be changed because temperatures and flow rates of the cooling water in the plurality of cooling circuits vary according to circumstances.

Further, in a configuration in which the plurality of circuits are in communication with each other to exchange heat with each other, the relative locational relationship in height among the circuits may change. As such, the object circuit for which the degassing is performed may change.

In view of the foregoing points, it is an objective of the present disclosure to provide a thermal management device for a vehicle that includes a plurality of heating medium circuits and that is configured to perform degassing in a reserve tank while suppressing an occurrence of heat loss.

A thermal management device for a vehicle according to the present disclosure includes a plurality of heat medium circuits, a reserve tank, and a connector.

The heat medium circulates through the heat medium circuits separately. The reserve tank is configured to separate an air bubble contained in the heat medium from the heat medium. The connector allows the reserve tank to come in communication with the heat medium circuits selectively.

Accordingly, the reserve tank can come in communication with the heat medium circuits selectively, therefore the degassing can be performed in the respective one of the heat medium circuits selectively.

Since the reserve tank is configured not to be in communication with the plurality of heat medium circuits at the same time, it can be prevented that the heat medium from the plurality of heat medium circuits are mixed through the reserve tank. As such, the heat loss due to the mixing of the heat medium can be suppressed.

BRIEF DESCRIPTION OF DRAWINGS

The above and other objects, features and advantages of the present disclosure will become more apparent from the following detailed description referring to the drawings described herein.

DESCRIPTION OF EMBODIMENTS

Figure 1:
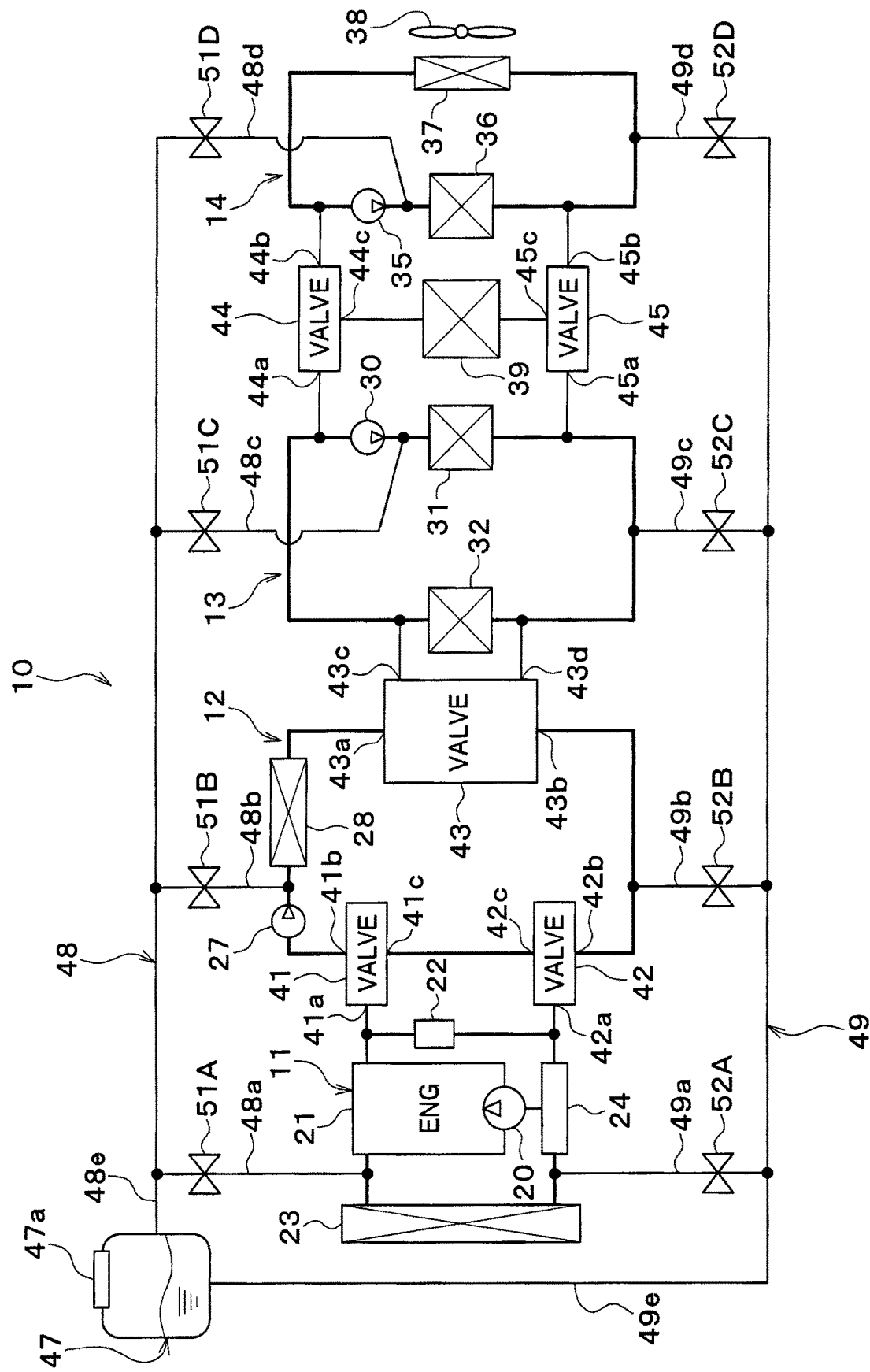
FIG. 1 is a diagram illustrating an overall configuration of a thermal management device for a vehicle in a first embodiment.

Hereinafter, embodiments for implementing the present disclosure will be described referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The present disclosure is not limited to combinations of embodiments which combine parts that are explicitly described as being combinable. As long as no problems are present, the various embodiments may be partially combined with each other even if not explicitly described.

First Embodiment

A thermal management device 10 for a vehicle illustrated in FIG. 1 is used for adjusting temperatures of various devices mounted to the vehicle and a temperature of the inside of a vehicle compartment to an appropriate temperature. In the present embodiment, the thermal management device 10 for a vehicle is applied to a hybrid vehicle that generates driving force for moving the vehicle from an engine and an electric motor.

The hybrid vehicle in the present embodiment is configured as a plug-in hybrid vehicle that is configured to charge a battery mounted to the vehicle with power supplied from an external power source while the vehicle is stopped. For example, the battery may be a lithium ion battery.

The driving force generated by the engine is used for operating a motor generator, and for moving the vehicle as well. Power generated by the motor generator and power supplied from the external power source can be stored in the battery. The power stored in the battery may be supplied to the electric motor, and to various devices, which are mounted to the vehicle, such as various electric components in the thermal management device 10 for a vehicle as well.

The thermal management device 10 for a vehicle is provided with an engine circuit 11, a heater circuit 12, a warm water circuit 13, and a cool water circuit 14. The engine circuit 11, the heater circuit 12, the warm water circuit 13, and the cool water circuit 14 are cooling water circuits that allow a cooling water to circulate therethrough.

The cooling water is a fluid serving as a heat medium. For example, the cooling water may be a liquid containing at least ethylene glycol, dimethylpolysiloxane, or nanofluid, or may be anti-freezing liquid. A plurality of heat medium circuits includes the engine circuit 11, the heater circuit 12, the warm water circuit 13, and a cool water circuit 14 that allows the heat medium to circulate therethrough separately.

The engine circuit 11 serves as a cooling water circuit that is configured to cool an engine 21 with the cooling water. The engine circuit 11 mounts an engine pump 20, the engine 21, a exhaust heat recovery device 22, and a radiator 23.

The engine pump 20 may be an electric pump that draws cooling water and discharges the cooling water. The engine pump 20 may be a belt driven pump. The belt driven pump may be driven when the force generated by the engine 21 is transmitted thereto via a belt.

The exhaust heat recovery device 22 is a heat exchanger that is configured to recover heat of the exhaust gas from the engine 21 by performing a heat exchange between the exhaust gas and the cooling water. The engine 21 and the exhaust heat recovery device 22 are heating devices that is configured to generate heat when being operated.

The engine pump 20, the engine 21, and the exhaust heat recovery device 22 are connected to the engine circuit 11 in series so that the cooling water flows through the engine pump 20, the engine 21, and the exhaust heat recovery device 22 in this order.

The radiator 23 serves as a water-air heat exchanger that is configured to perform a heat exchange between the cooling water and an air (referred to as the outside air hereafter) from an outside of the vehicle compartment. The radiator 23 is arranged in series with the exhaust heat recovery device 22 in a flow direction of the cooling water.

The engine circuit 11 mounts a thermostat 24. The thermostat 24 is a water temperature responsive valve that is configured by a mechanical mechanism and is configured to open and close a cooling water passage by moving a valve body with thermostatic wax of which volume varies according to a temperature.

The thermostat 24 closes the cooling water passage adjacent to the radiator 23 to block a flow of the cooling water toward the radiator 23 when a temperature of the cooling water is lower than a specified temperature (e.g., 70° C.).

The heater circuit 12 mounts a heater pump 27 and a heater core 28. The heater core 28 is an air heating heat exchanger that is configured to perform a heat exchange between the cooling water and air supplied to the vehicle compartment thereby heating the air supplied to the vehicle compartment. The heater core 28 is a heat exchanger for heating the vehicle compartment. The heater core 28 serves as a warm-heat-medium heat exchanger that is configured to heat the air by exchanging heat with the heat medium heated by a device such as a heater 31. The heater pump 27 and the heater core 28 are connected to the heater circuit 12 in series.

The warm water circuit 13 mounts a warm water pump 30, the heater 31, and an electric device 32. The warm water pump 30 may be an electric pump that draws cooling water and discharges the cooling water. The warm water pump 30 may be a belt driven pump.

The heater 31 is a high-pressure-side heat exchanger that is configured to heat the cooling water by performing a heat exchange between a high-pressure refrigerant in a refrigeration circuit (not shown) and the cooling water. The heater 31 may be an electric heater that is configured to heat the cooling water.

The heater 31 serves as a heat-medium heating heat exchanger that is configured to heat the heat medium. The warm water circuit 13 is a warm heat medium circuit that allows the heat medium, which is heated in the heater 31, to circulate therethrough.

The electric device 32 is a device such as an inverter that is configured to generate heat when being operated. The electric device 32 is a waste-heat supplying device that supplies waste heat to the cooling water. The electric device 32 is necessarily cooled to an allowable temperature (e.g., a heat-resistant temperature or an operation guarantee temperature) or lower.

The warm water pump 30, the heater 31, and the electric device 32 are connected to the warm water circuit 13 in series so that the cooling water flows through the warm water pump 30, the heater 31, and the electric device 32 in this order.

The cool water circuit 14 mounts a cool water pump 35, a cooler 36, and a cooler core 37. The cool water pump 35 may be an electric pump that draws cooling water and discharges the cooling water. The cool water pump 35 may be a belt driven pump.

The cooler 36 is a low-pressure-side heat exchanger that is configured to cool the cooling water by performing a heat exchange between a low-pressure refrigerant in the refrigeration circuit (not shown) and the cooling water. For example, the cooler 36 may be a Peltier element that cools the cooling water.

The cooler 36 is a heat medium cooling heat exchanger that is configured to cool the heat medium. The cool water circuit 14 is a cool heat medium circuit that allows the heat medium, which is cooled in the cooler 36, to circulate therethrough.

The cooler core 37 is an air cooling heat exchanger that is configured to perform a heat exchange between the cooling water and air supplied to the vehicle compartment thereby cooling the air supplied to the vehicle compartment. The cooler core 37 is a heat exchanger for cooling the vehicle compartment. The cooler core 37 is a cooling heat medium heat exchanger that is configured to exchange heat with the heat medium cooled in the cooler 36.

The cool water pump 35, the cooler 36, and the cooler core 37 are connected to the cool water circuit 14 in series so that the cooling water flows through the cool water pump 35, the cooler 36, and the cooler core 37 in this order.

The refrigeration circuit (not shown) is a vapor compression refrigerator that mounts a compressor (not shown), the heater 31, an expansion valve (not shown), and the cooler 36. The refrigerant of the refrigeration circuit may be a fluorocarbon refrigerant. The refrigeration circuit is a sub-critical refrigeration circuit in which the pressure of the high-pressure refrigerant does not exceed the critical pressure of the refrigerant.

The compressor may be an electric compressor that is driven by power supplied from the battery. The compressor is configured to draw, compresses, and discharges the refrigerant in the refrigeration circuit. The compressor may be a belt driven compressor that is driven by an engine belt using the force generated by the engine 21.

The heater 31 serves as a condenser that is configured to condense the high-pressure refrigerant by performing a heat exchange between the high-pressure refrigerant discharged from the compressor and the cooling water.

The expansion valve serves as a pressure reducer that is configured to decompress and expand a liquid-phase refrigerant flowing out of the heater 31. The expansion valve includes a thermosensitive portion. The thermosensitive portion is configured to detect a degree of superheat of the refrigerant proximate to an outlet of the cooler 36 based on a temperature and a pressure of the refrigerant proximate to the outlet of the cooler 36.

That is, the expansion valve serves as a thermosensitive expansion valve that adjusts a throttle degree of a passage sectional area by a mechanical mechanism so that the degree of superheat of the refrigerant proximate to the outlet of the cooler 36 falls within a specified range. The expansion valve may be an electric expansion valve that adjusts the throttle degree of the passage sectional area by an electric mechanism.

The cooler 36 serves as the low-pressure-side heat exchanger that is configured to evaporate the low-pressure refrigerant by performing a heat exchange between the low-pressure refrigerant, which is decompressed and expanded in the expansion valve, and the air supplied to the vehicle compartment. The liquid-phase refrigerant evaporated by the cooler 36 is drawn into the compressor and compressed.

The cooler 36 may be a heat medium cooler that is configured to cool the cooling water by performing a heat exchange between the refrigerant and the cooling water. In this case, the air supplied to the vehicle compartment can be cooled by mounting the heat medium-air heat exchanger, which is configured to perform a heat exchange between the cooling water cooled in the heat medium cooler and the air, independently.

A temperature regulator 39 is connectable to the warm water circuit 13 and the cool water circuit 14. The temperature regulator 39 is a device of which temperature is adjusted to an appropriate temperature by the cooling water in the warm water circuit 13 or the cool water circuit 14.

The engine circuit 11 and the heater circuit 12 are connected to a first switching valve 41 and a second switching valve 42. The first switching valve 41 and the second switching valve 42 serve as switching members that are configured to switch fluid communication states of the engine circuit 11 and the heater circuit 12.

When the first switching valve 41 and the second switching valve 42 allow a fluid communication between the engine circuit 11 and the heater circuit 12, the cooling water circulates between the engine circuit 11 and the heater circuit 12.

When the first switching valve 41 and the second switching valve 42 shut off a fluid communication between the engine circuit 11 and the heater circuit 12, a transmission of pressure between the engine circuit 11 and the heater circuit 12 is shut off. The first switching valve 41 together with the second switching valve 42 serves as a shutoff valve that is configured to shut off the transmission of pressure between the engine circuit 11 and the heater circuit 12.

The first switching valve 41 is a three-way valve including three ports. A first port 41a of the first switching valve 41 is connected to a cooling water outlet side of the engine 21 and to a cooling water inlet side of the exhaust heat recovery device 22 in the engine circuit 11. A second port 41b of the first switching valve 41 is connected to a cooling water suction side of the heater pump 27 in the heater circuit 12. A third port 41c of the first switching valve 41 is connected to a cooling water outlet side of the heater core 28 in the heater circuit 12.

The second switching valve 42 is a three-way valve including three ports. A first port 42a of the second switching valve 42 is connected to a cooling water outlet side of the exhaust heat recovery device 22 and to a cooling water suction side of the engine pump 20 in the engine circuit 11. A second port 42b of the second switching valve 42 is connected to the cooling water outlet side of the heater core 28 in the heater circuit 12. A third port 42c of the second switching valve 42 is connected to the third port 41c of the first switching valve 41.

The heater circuit 12 and the warm water circuit 13 are connected to a third switching valve 43. The third switching valve 43 serves as a switching member that is configured to switch fluid communication states of the heater circuit 12 and the warm water circuit 13.

When the third switching valve 43 allows a fluid communication between the heater circuit 12 and the warm water circuit 13, the cooling water circulates between the heater circuit 12 and the warm water circuit 13.

When the third switching valve 43 shuts off a fluid communication between the heater circuit 12 and the warm water circuit 13, a transmission of pressure between the heater circuit 12 and the warm water circuit 13 is shut off. The third switching valve 43 serves as a shutoff valve that is configured to shut off the transmission of pressure between the heater circuit 12 and the warm water circuit 13.

The third switching valve 43 is a four-way valve including four ports. A first port 43a of the third switching valve 43 is connected to the cooling water outlet side of the heater core 28 in the heater circuit 12. A second port 43b of the third switching valve 43 is connected to the second port 42b of the second switching valve 42. A third port 43c of the third switching valve 43 is connected to a cooling water outlet side of the electric device 32 and to a cooling water suction side of the warm water pump 30 in the warm water circuit 13. A fourth port 43d of the third switching valve 43 is connected to a cooling water outlet side of the heater 31 and to a cooling water inlet side of the electric device 32 in the warm water circuit 13.

The warm water circuit 13 and the cool water circuit 14 are connected to a fourth switching valve 44 and a fifth switching valve 45. The fourth switching valve 44 and the fifth switching valve 45 serve as a switching member that is configured to switch fluid communication states of the warm water circuit 13 and the cool water circuit 14.

When the fourth switching valve 44 and the fifth switching valve 45 allow a fluid communication between the warm water circuit 13 and the cool water circuit 14, the cooling water circulates between the warm water circuit 13 and the cool water circuit 14 is shut off.

When the fourth switching valve 44 and the fifth switching valve 45 shut off a fluid communication between the warm water circuit 13 and the cool water circuit 14, a transmission of pressure between the warm water circuit 13 and the cool water circuit 14 is shut off. The fourth switching valve 44 together with the fifth switching valve 45 serves as a shutoff valve that is configured to shut off the transmission of pressure between the warm water circuit 13 and the cool water circuit 14.

When the fourth switching valve 44 and the fifth switching valve 45 shut off a fluid communication between the warm water circuit 13 and the cool water circuit 14, a transmission of pressure between the warm water circuit 13 and the cool water circuit 14 is shut off.

The fourth switching valve 44 is a three-way valve including three ports. A first port 44a of the fourth switching valve 44 is connected to the cooling water outlet side of the electric device 32 and to the cooling water suction side of the warm water pump 30 in the warm water circuit 13. A second port 44b of the fourth switching valve 44 is connected to a cooling water outlet side of the cooler core 37 and to a cooling water suction side of the cool water pump 35 in the cool water circuit 14. A third port 44c of the fourth switching valve 44 is connected to a cooling water outlet side of the temperature adjuster 39.

The fifth switching valve 45 is a three-way valve including three ports. A first port 45a of the fifth switching valve 45 is connected to the cooling water outlet side of the heater 31 and to the cooling water inlet side of the electric device 32 in the warm water circuit 13. A second port 45b of the fifth switching valve 45 is connected to the cooling water outlet side of the cooler 36 and to the cooling water inlet side of the cooler core 37 in the cool water circuit 14. A third port 45c of the fifth switching valve 45 is connected to a cooling water inlet side of the temperature adjuster 39.

A reserve tank 47 serves as a cooling water reservoir that stores excess cooling water. The reserve tank 47 serves as a pressure regulator as well that adjusts the pressure in the cooling water circuit to an appropriate range. The reserve tank 47 also serves as a gas-liquid separator that is configured to separate an air bubble contained in the cooling water from the cooling water.

The reserve tank 47 is configured to maintain a pressure of the cooling water to an appropriate pressure in response to an abnormal rise or drop in the pressure caused when the cooling water is expanded or compressed due to a temperature change. By storing the excess cooling water in the reserve tank 47, a flow rate of the cooling water circulating in the circulation path 12 can be prevented from decreasing.

The reserve tank 47 includes a cap 47a. The cap 47a includes a pressure adjustment mechanism. The pressure adjustment mechanism of the cap 47a intermittently allows an internal space of the reserve tank 47 to be open to the atmosphere so that the internal pressure of the reserve tank 47 is maintained within a specified range.

The reserve tank 47 is connected to the engine circuit 11, the heater circuit 12, the warm water circuit 13, and the cool water circuit 14 through an inlet pipe 48 and an outlet pipe 49. The inlet pipe 48 and the outlet pipe 49 define passages therein allowing the cooling water to flow therethrough and connect the reserve tank 47 to the cooling water circuits 11-14.

The inlet pipe 48 is a cooling water pipe that connects a cooling water inlet of the reserve tank 47 to the engine circuit 11, the heater circuit 12, the warm water circuit 13, and the cool water circuit 14. The inlet pipe 48 includes a common inlet pipe 48e and a plurality of circuit inlet pipes 48a, 48b, 48c, 48d. The common inlet pipe 48e is connected to the cooling water inlet of the reserve tank 47. The circuit inlet pipes 48a, 48b, 48c, 48d branches from the common inlet pipe 48e toward the cooling water circuits 11-14 respectively.

The common inlet pipe 48e is a common pipe connected to the reserve tank 47. The circuit inlet pipes 48a, 48b, 48c, 48d serve as circuit pipes that branch from the common inlet pipe 48e toward the heat medium circuits 11-14.

The outlet pipe 49 is a cooling water pipe that connects a cooling water outlet of the reserve tank 47 to the engine circuit 11, the heater circuit 12, the warm water circuit 13, and the cool water circuit 14. The outlet pipe 49 includes a common outlet pipe 49e and a plurality of circuit outlet pipes 49a, 49b, 49c, 49d. The common outlet pipe 49e is connected to the cooling water outlet of the reserve tank 47. The circuit outlet pipes 49a, 49b, 49c, 49d branches from the common inlet pipe 49e toward the cooling water circuits 11-14 respectively.

The common outlet pipe 49e is a common pipe connected to the reserve tank 47. The circuit outlet pipes 49a, 49b, 49c, 49d serve as circuit pipes that branch from the common outlet pipe 49e toward the heat medium circuits 11-14.

The circuit inlet pipes 48a, 48b, 48c, 48d includes a heater circuit inlet pipe 48a that is connected to the cooling water outlet side of the engine 21 and to a cooling water inlet side of the radiator 23 in the engine circuit 11. A first inlet valve 51A is mounted to the heater circuit inlet pipe 48a. The first inlet valve 51A is a switching valve that is configured to open and close a cooling water passage defined in a heater-circuit inlet pipe 48a.

The circuit inlet pipes 48a, 48b, 48c, 48d includes a second-circuit inlet pipe 48b that is connected to the cooling water discharge side of the heater pump 27 and to a cooling water inlet side of the heater core 28 in the heater circuit 12. A second inlet valve 51B is mounted to the second-circuit inlet pipe 48b. The second inlet valve 51B is a switching valve that is configured to open and close a cooling water passage defined in the second-circuit inlet pipe 48b.

The circuit inlet pipes 48a, 48b, 48c, 48d includes a third-circuit inlet pipe 48c that is connected to the cooling water discharge side of the warm water pump 30 and to a cooling water inlet side of the heater 31 in the warm water circuit 13. A third inlet valve 51C is mounted to the third-circuit inlet pipe 48c. The third inlet valve 51C is a switching valve that is configured to open and close a cooling water passage defined in the third-circuit inlet pipe 48c.

The circuit inlet pipes 48a, 48b, 48c, 48d includes a fourth-circuit inlet pipe 48d that is connected to the cooling water discharge side of the cool water pump 35 and to a cooling water inlet side of the cooler 36 in the cool water circuit 14. A fourth inlet valve 51D is mounted to the fourth-circuit inlet pipe 48d. The fourth inlet valve 51D is a switching valve that is configured to open and close a cooling water passage defined in the fourth-circuit inlet pipe 48d.

The circuit outlet pipes 49a, 49b, 49c, 49d includes a first-circuit outlet pipe 49a that is connected to a cooling water outlet side of the radiator 23 and to the cooling water suction side of the engine pump 20 in the engine circuit 11. A first outlet valve 52A is mounted to the first-circuit outlet pipe 49a. The first outlet valve 52A is a switching valve that is configured to open and close a cooling water passage defined in the first-circuit outlet pipe 49a.

The circuit outlet pipes 49a, 49b, 49c, 49d includes a second-circuit outlet pipe 49b that is connected to the second port 42b of the second switching valve 42 and to the third port 43c of the third switching valve 43 in the heater circuit 12. A second outlet valve 52B is mounted to the second-circuit outlet pipe 49b. The second outlet valve 52B is a switching valve that is configured to open and close a cooling water passage defined in the second-circuit outlet pipe 49b.

The circuit outlet pipes 49a, 49b, 49c, 49d includes a third-circuit outlet pipe 49c that is connected the cooling water outlet side of the heater 31 and to the cooling water inlet side of the electric device 32 in the warm water circuit 13. A third outlet valve 52C is mounted to the third-circuit outlet pipe 49c. The third outlet valve 52C is a switching valve that is configured to open and close a cooling water passage defined in a third-circuit outlet pipe 49c.

The circuit outlet pipes 49a, 49b, 49c, 49d includes a fourth-circuit outlet pipe 49d that is connected the cooling water outlet side of the cooler 36 and to the cooling water inlet side of the cooler core 37 in the cool water circuit 14. A fourth outlet valve 52D is mounted to the fourth-circuit outlet pipe 49d. The fourth outlet valve 52D is a switching valve that is configured to open and close a cooling water passage defined in the fourth-circuit outlet pipe 49d.

The reserve tank 47 is configured to come in communication with the cooling water circuits 11-14 selectively by operating the first to fourth inlet valves 51A-51D and the first to fourth outlet valves 52A-52D. The first to fourth inlet valves 51A-51D and the first to fourth outlet valves 52A-52D serve as a connector that is configured to connect the reserve tank 47 to the cooling water circuits 11-14 selectively.

When the first inlet valve 51A and the first outlet valve 52A are open, the reserve tank 47 comes in communication with the engine circuit 11. When the second inlet valve 51B and the second outlet valve 52B are open, the reserve tank 47 comes in communication with the heater circuit 12.

When the third inlet valve 51C and the third outlet valve 52C are open, the reserve tank 47 comes in communication with the warm water circuit 13. When the fourth inlet valve 51D and the fourth outlet valve 52D are open, the reserve tank 47 comes in communication with the cool water circuit 14.

The cooler core 37 and the heater core 28 are housed in an air conditioning case (not shown). The air-conditioning case is an air-passage forming member that defines an air passage therein.

The heater core 28 is positioned downstream of the cooler core 37 in a flow direction of the air in the air passage inside the air-conditioning case. The air-conditioning case is disposed inside an instrument panel (not shown) located at the foremost part of the inside of the vehicle compartment.

An inside/outside air switching case (not shown) and an interior blower 38 are arranged in the air conditioning case. The inside/outside air switching case serves as an inside/outside air switching unit that introduces inside air and outside air into the air passage inside the air-conditioning case selectively. The interior blower 38 is a blower that is configured to selectively draw an inside air and an outside air introduced into an air passage defined in the air conditioning case via the inside/outside air switching case.

The cooler core 37 and the heater core 28 are air-conditioning heat exchangers for air conditioning that each are configured to perform a heat exchange between the air from the interior blower 38 and the cooling water.

An air mix door (not shown) is positioned between the cooler core 37 and the heater core 28 in the air passage inside the air-conditioning case. The air mix door adjusts an a ratio between a volume of cool air, which flows into the heater core 28 after passing through the cooler core 37, and a volume of cool air, which bypasses the heater core 28 after passing through the cooler core 37.

The air mix door is a rotary door that includes a rotary shaft and a door body. The rotary shaft is supported by the air-conditioning case to be rotatable. The door body is coupled with the rotary shaft. A temperature of conditioned air, which is discharged from the air conditioning case into the vehicle compartment, can be adjusted to a desired temperature by adjusting an opening position of the air mix door.

The rotary shaft of the air mix door is driven by a servomotor. The operation of the servomotor is controlled by a controller 60.

Figure 2:
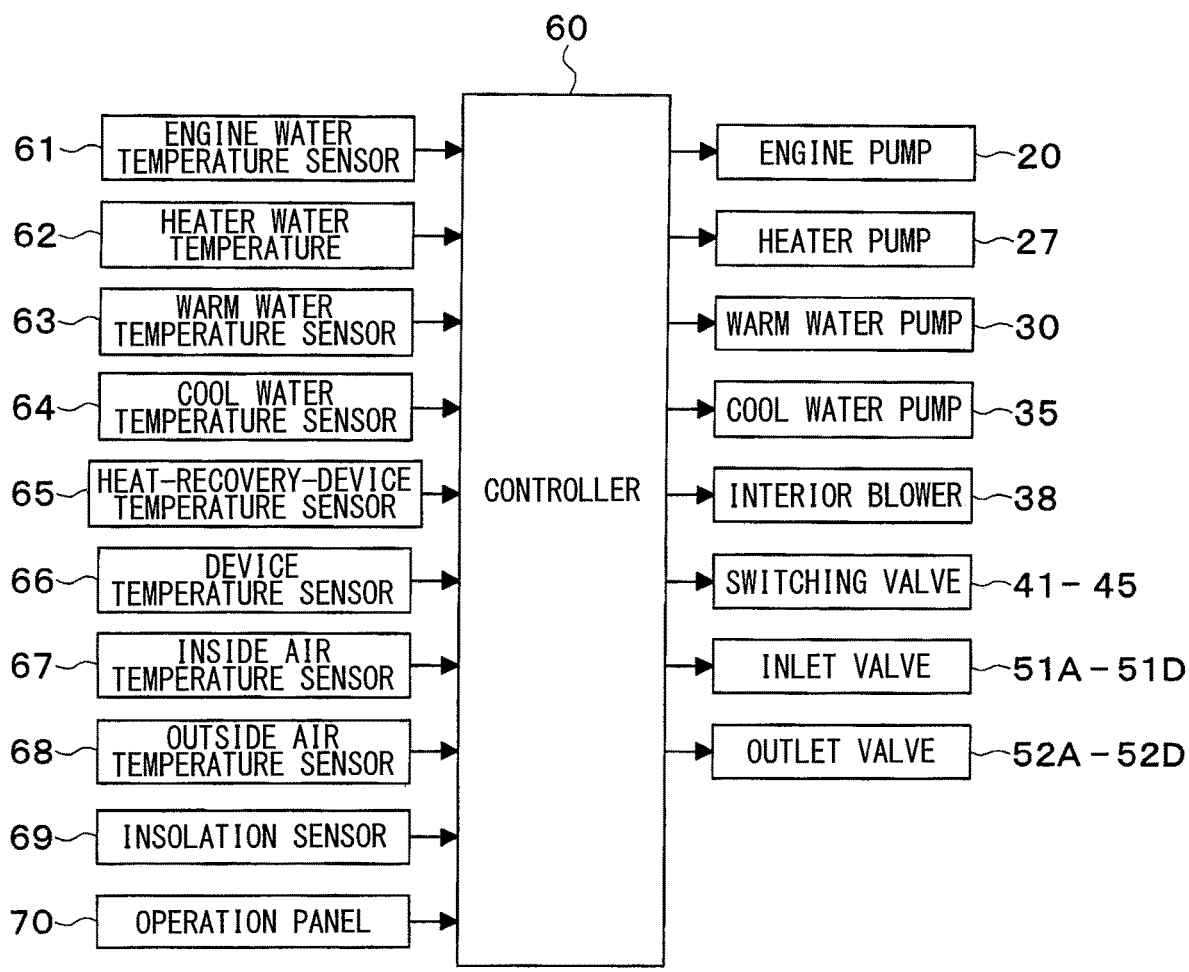
FIG. 2 is a block diagram illustrating an electric controller of the thermal management device for a vehicle in the first embodiment.

Next, an electric controller of the thermal management device 10 for a vehicle will be described with reference to FIG. 2. The controller 60 includes a known microcomputer including CPU, ROM, RAM and the like, and peripheral circuits. The controller 60 performs various calculations and processes based on a control program stored in the ROM. Various control target devices are connected to an output side of the controller 60. The controller 60 is a control unit that controls the control target devices.

The control target device controlled by the controller 60 may be the engine pump 20, the heater pump 27, the warm water pump 30, the cool water pump 35, the interior blower 38, the first to fifth switching valves 41-45, the first to fourth inlet valves 51A-51D, the first to fourth outlet valves 52A-52D, and the compressor.

Detection signals from a sensor group are input to the input side of the controller 60. The sensor group includes an engine water temperature sensor 61, a heater water temperature sensor 62, a warm water temperature sensor 63, a cool water temperature sensor 64, a heat-recovery-device temperature sensor 65, a device temperature sensor 66, an inside air temperature sensor 67, an outside air temperature sensor 68, and an insolation sensor 69.

The engine water temperature sensor 61 is a heat medium temperature detector that is configured to detect a temperature of the cooling water in the engine circuit 11. The heater water temperature sensor 62 is a heat medium temperature detector that is configured to detect a temperature of the cooling water in the heater circuit 12. The warm water temperature sensor 63 is a heat medium temperature detector that is configured to detect a temperature of the cooling water in the warm water circuit 13. The cool water temperature sensor 64 is a heat medium temperature detector that is configured to detect a temperature of the cooling water in the cool water circuit 14.

The heat-recovery-device temperature sensor 65 is a temperature detector that is configured to detect a temperature of the exhaust heat recovery device 22. The device temperature sensor 66 is a temperature detector that is configured to detect a temperature of the electric device 32.

The inside air temperature sensor 67 is an inside air temperature detector that is configured to detect a temperature of the inside air. The outside air temperature sensor 68 is an outside air temperature detector that is configured to detect a temperature of the outside air. The insolation sensor 69 is an insolation detector that is configured to detect an amount of solar radiation.

Operation signals from various air-conditioning operation switches are input to the input side of the controller 60. The various air-conditioning operation switches are included an operation panel 70 arranged near the instrument panel located at the foremost part of the inside of the vehicle compartment. The various air-conditioning operation switches of the operation panel 70 include an air conditioning switch, an automation switch, an air volume setting switch for the interior blower 38, and a vehicle-compartment inside temperature setting switch.

The air-conditioning switch is configured to switch an operation state of the compressor of the refrigeration circuit between on and off. The automation switch is configured to or cancel an automatic control for the air conditioning. The vehicle-compartment inside temperature setting switch is a target temperature setting part that is configured to set a target temperature of the vehicle-compartment inside temperature in response to an operation of an occupant.

Next, the operation with the above-described configuration will be described. The controller 60 calculates a target supply temperature TAO of the air supplied to the vehicle compartment, and switches between a heating mode and a non-heating mode based on the target supply temperature TAO. The heating mode is an air-conditioning mode that heats the inside of the vehicle compartment. The non-heating mode is an air-conditioning mode that does not heat the inside of the vehicle compartment. For example, the non-heating mode may be a cooling mode that cools the inside of the vehicle compartment or may be a fan mode that supplies air into the vehicle compartment.

The target supply temperature TAO is calculated using, for example, the following equation.

$$TAO = Kset \times Tset - Kr \times Tr - Kam \times Tam - Ks \times As + C$$

Tset is a vehicle-compartment inside set temperature set by the vehicle-compartment inside temperature setting switch, Tr is the inside air temperature detected by the inside air temperature sensor 67, Tam is the outside air temperature detected by the outside air temperature sensor 68, and As is the amount of solar radiation detected by the insolation sensor 69. Kset, Kr, Kam, and Ks are control gains, and C is a constant for correction.

The target supply temperature TAO corresponds to the amount of heat that needs to be generated by the thermal management device 10 for a vehicle in order to maintain the inside temperature in the vehicle compartment at a desired temperature. That is, the target supply temperature TAO may be an air-conditioning load applied to the thermal management device 10 for a vehicle. In the heating mode, the target supply temperature TAO may be a heating load applied to the thermal management device 10 for a vehicle.

The controller 60 operates the heating mode when the target supply temperature TAO is higher than the inside air temperature Tr. The controller 60 operates the cooling mode when the target supply temperature TAO is lower than the inside air temperature Tr.

The controller 60 sets a target temperature TCO of the cooler core 37 based on a target supply temperature TAO. Specifically, the controller 60 decreases the target temperature TCO as the target supply temperature TAO falls. Further, the controller 60 sets the target temperature TCO to be higher than or equal to a reference anti-frosting temperature (e.g., 1° C.) that is set to prevent the cooler core 37 from being frosted.

Then, the controller 60 controls devices such as a compressor mounted to a refrigeration circuit so that a temperature of the cooling water flowing into the cooler core 37 approaches the target temperature TCO.

The controller 60 sets a target temperature THO of the heater core 28 based on the target supply temperature TAO. Specifically, the controller 60 increases the target temperature THO as the target supply temperature TAO increases.

The controller 60 controls the engine 21, the first to third switching valves 41 to 43, and the compressor of the refrigeration circuit so that a temperature of the cooling water flowing into the heater core 28 approaches the target temperature THO.

For example, the controller 60 operates the first switching valve 41 and the second switching valve 42 to connect the engine circuit 11 and the heater circuit 12 to each other so that the air supplied to the vehicle compartment is heated in the heater core 28 with the waste heat from the engine 21 and the exhaust heat in the exhaust heat recovery device 22.

For example, the controller 60 operates the third switching valve 43 to connect the heater circuit 12 and the warm water circuit 13 to each other so that the air supplied to the vehicle compartment is heated in the heater core 28 using the cooling water heated in the heater 31.

A dehumidification heating operation can be performed to dehumidify and heat the inside of the vehicle compartment in a manner that the cool air, which is dehumidified and cooled in the cooler core 37, is heated in the heater core 28 and then is supplied to the vehicle compartment.

The controller 60 switches a connection state of the engine circuit 11, the heater circuit 12, the warm water circuit 13, and the cool water circuit 14 with the reserve tank 47 according to various scenes. Specifically, the controller 60 controls the operations of the first to fourth inlet valves 51A to 51D and the first to fourth outlet valves 52A to 52D to switch a connection target of the reserve tank 47.

For example, the controller 60 connects the reserve tank 47 to any one of the engine circuit 11, the heater circuit 12, the warm water circuit 13, and the cool water circuit 14 in normal traveling or in a maintenance service. The controller 60 switches the connection target of the reserve tank 47 on a time-series basis.

Under a condition of a small heat loss or under a condition that the heat loss may have less impact even when the heat loss is large, the controller 60 allows the reserve tank 47 to be connected to two or more of the engine circuit 11, the heater circuit 12, the warm water circuit 13, and the cool water circuit 14 at the same time. For example, the reserve tank 47 is connected to at least two cooling water circuits with a small temperature difference between temperatures of the cooling water circulating therethrough.

As a result, the reserve tank 47 is in communication with many cooling water circuits as possible, and the degassing the cooling water can be performed with high efficiently.

The condition where the reserve tank 47 is connected to the engine circuit 11 and the heater circuit 12 may be a condition where the heating operation is performed with the exhaust heat from the engine 21, i.e., a condition where a temperature of the cooling water in the engine circuit 11 is high.

For example, the reserve tank 47 may be connected to the engine circuit 11 and the warm water circuit 13 under the following conditions (i) to (iii).

(i) A condition where the heating operation (or a heat pump heating operation) using the cooling water heated in the heater 31 is performed and a temperature of the cooling water in the engine circuit 11 is within a specified range.

(ii) A condition where the temperature of the cooling water in the engine circuit 11 is a specified temperature or lower while cooling the electric device 32.

(iii) A condition where the temperature of the cooling water in the engine circuit 11 is a specified temperature or lower in the cooling operation.

For example, the reserve tank 47 may be connected to the heater circuit 12 and the warm water circuit 13 under the following conditions (iii) and (iv).

(iii) A condition where a heat pump assisted heating operation is performed. That is, in the condition, the amount of the exhaust heat in the exhaust heat recovery device 22 is insufficient relative to a required amount for performing the heating operation, and the heater 31 is needed to assist for performing the heating operation.

(iv) A condition where the target temperature THO of the heater core 28 is lower than the allowable temperature of the electric device 32.

For example, the reserve tank 47 may be connected to the engine circuit 11 and the cool water circuit 14 when the blower for air conditioning is stopped.

For example, the reserve tank 47 may be connected to the heater circuit 12 and the cool water circuit 14 under the following conditions (v) and (vi).

(v) A condition where the dehumidification operation is not requested. That is, the heating operation is performed without the cooler core 37 operated for the dehumidification operation.

(vi) A condition where a temperature of the cooler core 37 is lower than the target temperature TCO and a temperature of the heater core 28 is higher than the target temperature THO in the dehumidification heating operation.

For example, the reserve tank 47 may be connected to the warm water circuit 13 and the cool water circuit 14 under the following conditions (vii) to (ix).

(vii) A condition where the cooling operation is performed while the amount of waste heat generated by the electric device 32 is small. The amount of waste heat generated by the electric device 32 may be estimated from a factor such as an operational state of the electric device 32.

(viii) A condition where a temperature of the cooler core 37 is lower than a dew point of air flowing into the cooler core 37 in the dehumidification heating operation.

(ix) A condition where a temperature of the cooling water in the cooler core 37 is lower than a freezing point. Under this condition, the cooler core 37 can be prevented being frosted by connecting the reserve tank 47 to the warm water circuit 13 and the cool water circuit 14.

The controller 60 connects the reserve tank 47 to all of the engine circuit 11, the heater circuit 12, the warm water circuit 13, and the cool water circuit 14 in start-up the vehicle with an air-conditioning stopped, in a service mode (or a repair mode), or in stop of the vehicle.

Figure 3:
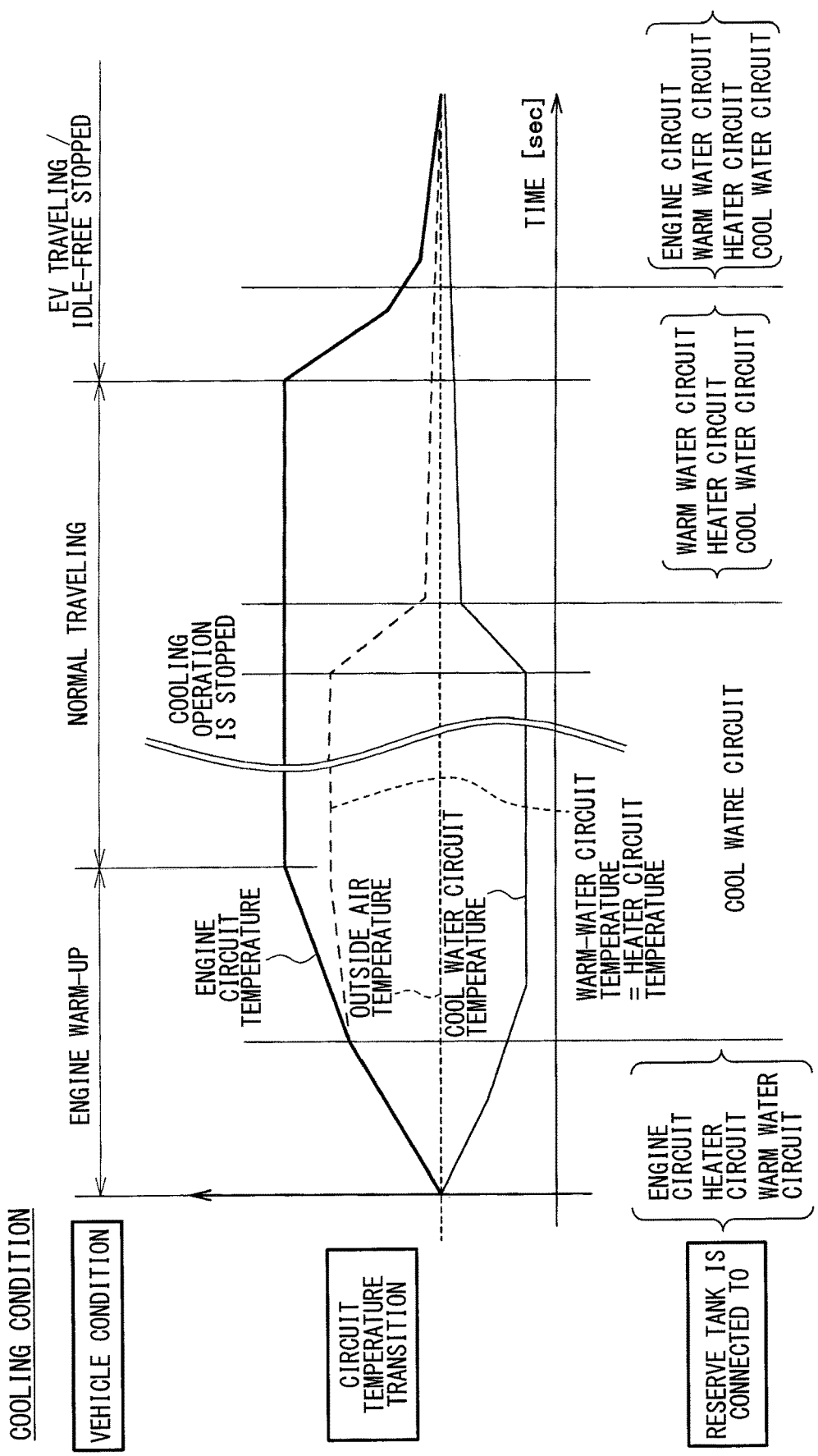
FIG. 3 is a time chart illustrating an example operation of the thermal management device for a vehicle in the first embodiment under a cooling condition.

FIG. 3 is a time chart illustrating an example switching operation of the reserve tank 47 under a cooling condition. The reserve tank 47 is in communication with the engine circuit 11, the heater circuit 12, and the warm water circuit 13 until a specified time elapses after starting the engine 21 and starting the cooling operation. As a result, degassing the cooling water is performed in the engine circuit 11, the heater circuit 12, and the warm water circuit 13.

In this period, the engine circuit 11, the heater circuit 12, and the warm water circuit 13 are connected to each other, whereby temperatures of the cooling water in the engine circuit 11, the heater circuit 12, and the warm water circuit 13 rise all together. As a result, the heat loss can be reduced even when the reserve tank 47 is connected to the engine circuit 11, the heater circuit 12, and the warm water circuit 13 at the same time. In this period, a temperature of the cooling water in the cool water circuit 14 falls.

The reserve tank 47 comes in communication with the cool water circuit 14 when the specified time elapses after starting the engine 21 starting the cooling operation. As a result, degassing the cooling water is performed in the cool water circuit 14. In this period, the reserve tank 47 may be connected to the engine circuit 11, the heater circuit 12, and the warm water circuit 13 selectively as required.

When the cooling operation is stopped in normal traveling, temperatures of the cooling water in the heater circuit 12, the warm water circuit 13, and the cool water circuit 14 approach the outside air temperature, and temperature differences among the temperatures become small. Thus, the reserve tank 47 is allowed to be connected to the heater circuit 12, the warm water circuit 13, and the cool water circuit 14. As a result, degassing the cooling water is performed in the heater circuit 12, the warm water circuit 13, and the cool water circuit 14.

When the vehicle comes in an EV traveling state or an idle-free stopped state, the temperatures of the cooling water in the engine circuit 11, the heater circuit 12, the warm water circuit 13, and the cool water circuit 14 approach the outside air temperature. Thus, the reserve tank 47 is allowed to be connected to the engine circuit 11, the heater circuit 12, the warm water circuit 13, and the cool water circuit 14. As a result, degassing the cooling water is performed in engine circuit 11, the heater circuit 12, the warm water circuit 13, and the cool water circuit 14.

Figure 4:
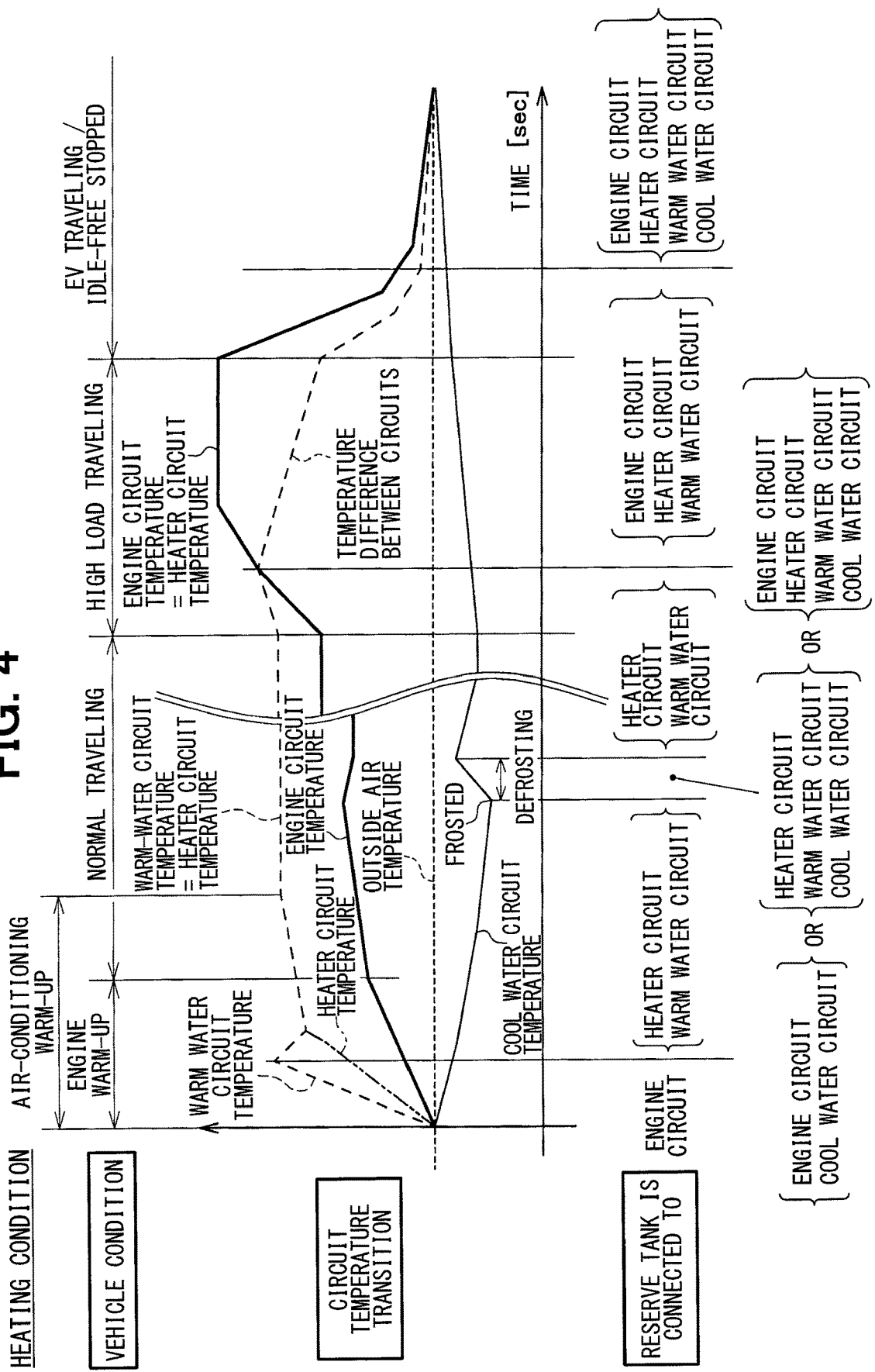
FIG. 4 is a time chart illustrating an example operation of the thermal management device for a vehicle in the first embodiment under a heating condition.
Figure 5:
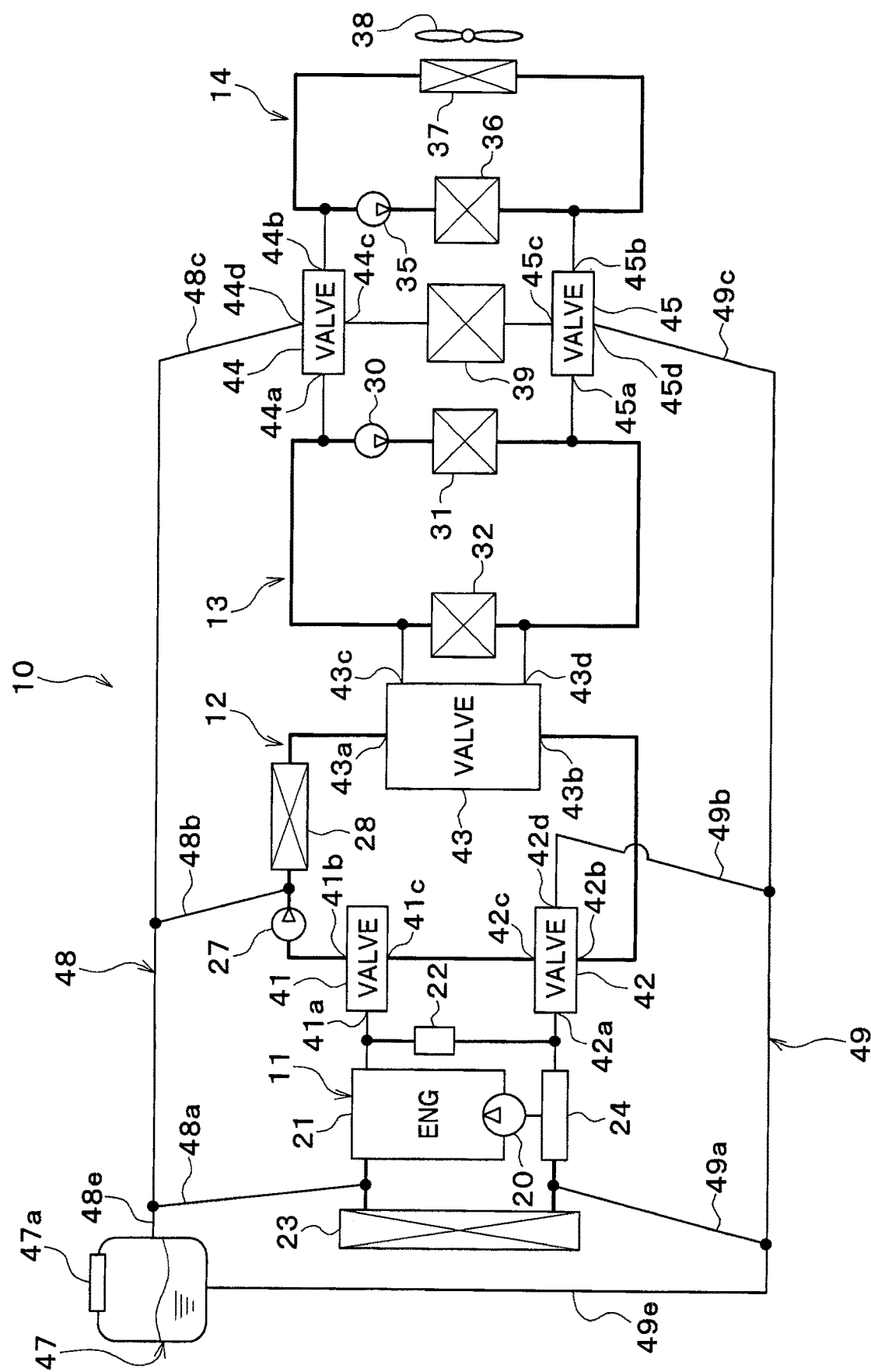
FIG. 5 is a diagram illustrating an overall configuration of a thermal management device for a vehicle in a second embodiment.

FIG. 4 is a time chart illustrating an example switching operation of the reserve tank 47 under the heating condition. The reserve tank 47 is in communication with the engine circuit 11 until the specified time elapses after starting the engine 21. As a result, degassing the cooling water is performed in the engine circuit 11.

The heater circuit 12 and the warm water circuit 13 are connected to each other and the heating operation is started when the specified time elapses after starting the engine 21. At this time, the reserve tank 47 is connected to the heater circuit 12 and the warm water circuit 13. As a result, degassing the cooling water is performed in the heater circuit 12 and the warm water circuit 13.

In this period, since the heater circuit 12 and the warm water circuit 13 are in communication with each other, temperatures of the cooling water in the heater circuit 12 and the warm water circuit 13 become equal to each other. As a result, the heat loss can be reduced even when the reserve tank 47 is connected to the heater circuit 12 and the warm water circuit 13 at the same time. In this period, the reserve tank 47 may be connected to the engine circuit 11 and the cool water circuit 14 selectively as required.

When a temperature of the cooling water in the cool water circuit 14 falls below the dew point and the cooler core 37 is frosted, the cool water circuit 14 is connected to the engine circuit 11. As a result, the cooler core 37 is defrosted. That is, the cooler core 37 is defrosted using the exhaust heat from the engine 21. At this time, the reserve tank 47 is connected to the engine circuit 11 and the cool water circuit 14. As a result, degassing the cooling water is performed in the engine circuit 11 and the cool water circuit 14.

The cooler core 37 may be defrosted by connecting the cool water circuit 14 with the heater circuit 12 and the warm water circuit 13. At this time, the reserve tank 47 is connected to the heater circuit 12, the warm water circuit 13, and the cool water circuit 14. As a result, degassing the cooling water is performed in the heater circuit 12, the warm water circuit 13, and the cool water circuit 14.

When the cooler core 37 is frosted, the cooler core 37 may be defrosted by connecting the cool water circuit 14 with the engine circuit 11, the heater circuit 12, the warm water circuit 13. At this time, the reserve tank 47 is connected to the engine circuit 11, the heater circuit 12, the warm water circuit 13, and the cool water circuit 14. As a result, degassing the cooling water is performed in engine circuit 11, the heater circuit 12, the warm water circuit 13, and the cool water circuit 14.

That is, in the defrosting operation, the reserve tank 47 is connected to the cool water circuit 14 and to another cooling water circuit connected to the cool water circuit 14. During this period, a temperature of the cooling water in the cool water circuit 14 and a temperature of cooling water in another cooling water circuit connected to the cool water circuit 14 are equal to each other. As such, the occurrence of the heat loss can be suppressed even when the reserve tank 47 is in communication with the cool water circuit 14 and the cooling water circuit connected to the cool water circuit 14.

A circuit to be connected to the cool water circuit 14 in defrosting may be selected according to the necessity of the degassing. That is, a circuit, which is given a priority on the degassing, may be connected to the cool water circuit 14 and the reserve tank 47. As such, the cooler core 37 is defrosted using heat of the cooling water circulating in the circuit given the priority on the degassing while degassing the cooling water is performed in the circuit given the priority on the degassing.

When the exhaust heat from the engine 21 increases and the temperature of the cooling water in the engine circuit 11 rises in high-load traveling, the engine circuit 11 is connected to the heater circuit 12 to perform the heating operation. That is, the heating operation is performed using the exhaust heat from the engine 21.

At this time, the reserve tank 47 is connected to the engine circuit 11 and the heater circuit 12. As a result, degassing the cooling water is performed in the engine circuit 11 and the heater circuit 12.

In this period, since the engine circuit 11 and the heater circuit 12 are in communication with each other, a temperature of the cooling water in the engine circuit 11 and a temperature of the cooling water in the heater circuit 12 becomes equal to each other. As a result, the heat loss can be reduced even when the reserve tank 47 is connected to the engine circuit 11 and the heater circuit 12 at the same time.

When the vehicle comes in an EV traveling state or an idle-free stopped state, the temperatures of the cooling water in the engine circuit 11, the heater circuit 12, the warm water circuit 13, and the cool water circuit 14 approach the outside air temperature. Thus, the reserve tank 47 is allowed to be connected to the engine circuit 11, the heater circuit 12, the warm water circuit 13, and the cool water circuit 14. As a result, degassing the cooling water is performed in engine circuit 11, the heater circuit 12, the warm water circuit 13, and the cool water circuit 14.

In the present embodiment, the first to fourth inlet valves 51A-51D and the first to fourth outlet valves 52A-52D connect the reserve tank 47 to the cooling water circuits 11-14 selectively.

Accordingly, the reserve tank 47 can come in communication with the cooling water circuits 11-14 selectively, therefore the degassing can be performed in the respective one of the cooling water circuits 11-14 selectively.

Since the reserve tank 47 is configured not to be in communication with the cooling water circuits at the same time, it can be prevented that the cooling water from the cooling water circuits are mixed through the reserve tank 47. As such, the heat loss due to the mixing of the cooling water can be suppressed.

In the present embodiment, when a temperature difference of the cooling water between at least two cooling water circuits of the plurality of cooling water circuit 11, 12, 13, 14 is within a specified range, the controller 60 controls the first to fourth inlet valves 51A-51D and the first to fourth outlet valves 52A-52D to allow the reserve tank 47 to come in communication with the at least two cooling water circuits.

As a result, when the heat loss is small with the reserve tank 47 connected to the at least two cooling water circuit, the degassing is performed in the at least two cooling water circuit at the same time so as to improve the degassing efficiency.

In the present embodiment, in the cooling (or in the cooling operation) in which the temperature in the vehicle compartment is decreased by air cooled in the cooler core 37, the controller 60 controls the first to fourth inlet valves 51A-51D and the first to fourth outlet valve 52A-52D to operate
(i) an operation mode in which the reserve tank 47 is in communication with the cooling water circuits 11, 12, 13 other than the cool water circuit 14 and (ii) an operation mode in which the reserve tank 47 is in communication with the cool water circuit 14.

Accordingly, an increase of the heat loss, which is caused when the cooling water in the cool water circuit 14 is mixed with the cooling water in another cooling water circuit during the cooling operation, can be suppressed.

In the present embodiment, in the heating (or in the heating operation) in which the temperature in the vehicle compartment is increased by air heated in the heater core 28, the controller 60 controls the first to fourth inlet valves 51A-51D and the first to fourth outlet valve 52A-52D to operate (i) an operation mode in which the reserve tank 47 is in communication with the cooling water circuits 11, 12, 14 other than the warm water circuit 13 and (ii) an operation mode in which the reserve tank 47 is in communication with the warm water circuit 13.

Accordingly, an increase of the heat loss, which is caused when the cooling water in the warm water circuit 13 is mixed with the cooling water in another cooling water circuit during the heating operation, can be suppressed.

In the present embodiment, the first to fourth inlet valves 51A-51D and the first to fourth outlet valves 52A-52D connect the reserve tank 47 to the cooling water circuits 11-14 selectively by opening and closing the pipes 48a-48d, 49a-49d.

As such, the reserve tank 47 comes in communication with the cooling water circuits 11, 12, 13, 14 selectively.

In the present embodiment, the cooling water circuits 11-14 includes a high-temperature cooling water circuit (or a high-temperature heat medium circuit) and a low-temperature cooling water circuit (or a low-temperature heat medium circuit). The cooling water in a high-temperature range flows through the high-temperature cooling water circuit. The cooling water in a low-temperature range flows through the low-temperature cooling water circuit.

Furthermore, when the circuit inlet pipes 48a, 48b, 48c, 48d includes one circuit inlet pipe connected to the high-temperature cooling water circuit and an other circuit inlet pipe connected to the low-temperature cooling water circuit, the one circuit inlet pipe may be positioned closer to the reserve tank 47 than the other circuit inlet pipe preferably.

The reason is that a flow rate of the cooling water flowing from the high-temperature cooling water circuit into the reserve tank 47 increases, therefore the degassing efficiency in the high-temperature cooling water circuit, which is given a priority on the degassing since the temperature of the cooling water therein is in the high-temperature range, can be improved.

For the same reason, when the circuit outlet pipes 49a, 49b, 49c, 49d includes one circuit outlet pipe connected to the high-temperature cooling water circuit and an other circuit outlet pipe connected to the low-temperature cooling water circuit, the one circuit outlet pipe may be positioned closer to the reserve tank 47 than the other circuit outlet pipe preferably.

Furthermore, when the circuit inlet pipes 48a, 48b, 48c, 48d includes one circuit inlet pipe connected to the high-temperature cooling water circuit and an other circuit inlet pipe connected to the low-temperature cooling water circuit, the one circuit inlet pipe may have an inner diameter that is greater than an inner diameter of the other circuit inlet pipe preferably.

The reason is that a flow rate of the cooling water flowing from the high-temperature cooling water circuit into the reserve tank 47 increases, therefore the degassing efficiency in the high-temperature cooling water circuit, which is given a priority on the degassing since the temperature of the cooling water therein is in the high-temperature range, can be improved.

For the same reason, when the circuit outlet pipes 49a, 49b, 49c, 49d includes one circuit outlet pipe connected to the high-temperature cooling water circuit and an other circuit outlet pipe connected to the low-temperature cooling water circuit, the one circuit outlet pipe may have an inner diameter that is greater than an inner diameter of the other circuit outlet pipe preferably.

In the present embodiment, the controller 60 controls the first to fourth inlet valves 51A-51D and the first to fourth outlet valves 52A-52D to allow the reserve tank 47 to come in communication with all of the cooling water circuits 11-14 when the interior blower 38 is stopped.

Accordingly, when a deterioration of the cooling and heating performance due to the heat loss is not necessarily considered, the degassing is performed in all of the cooling water circuits 11-14 so that the time required for completing the degassing can be shortened.

In the present embodiment, the controller 60 controls the first to fourth inlet valves 51A-51D and the first to fourth outlet valves 52A-52D to allow the reserve tank 47 to come in communication with all of the cooling water circuits 11-14 in the start-up of the vehicle or after stopping the vehicle.

As a result, when the degassing is needed in high necessity or when the heat loss has less effect, the degassing is performed in all of the cooling water circuits 11-14 so that the time required for completing the degassing can be shortened.

In the present embodiment, the controller 60 controls the operation of the first to fourth inlet valves 51A-51D and the first to fourth outlet valve 52A-52D to allow the reserve tank 47 to come in communication with the heater circuit 12 and the cool water circuit 14 (or the low-temperature cooling water circuit) in a heating operation with no dehumidification request or in a dehumidification heating operation with the cooling water in the low-temperature cool water circuit 14 having a temperature lower than the target temperature TCO of the cooler core 37 and with the cooling water in the heater circuit 12 (or the high-temperature cooling water circuit) having a temperature higher than the target temperature THO of the heater core 28.

As such, when the heat loss has less effect with the reserve tank 47 connected to the heater circuit 12 and the cool water circuit 14, the reserve tank 47 are connected to the heater circuit 12 and the cool water circuit 14 so that the degassing can be performed with high efficiency.

In the present embodiment, the controller 60 controls the operation of the first to fourth inlet valves 51A-51D and the first to fourth outlet valve 52A-52D to allow the reserve tank 47 to come in communication with the warm water circuit 13 (or the high-temperature heat medium circuit) and the cool water circuit 14 (or the low-temperature heat medium circuit) (i) in a cooling operation with small amount of the waste heat from the electric device 32, (ii) in a dehumidification heating operation with the cooler core 37 having a temperature lower than a dew point of the air flowing into the cooler core 37, or (iii) in a condition where the temperature of the cooler core 37 is lower than a freezing point.

As such, when the heat loss has less effect with the reserve tank 47 connected to the warm water circuit 13 and the cool water circuit 14, the reserve tank 47 are connected to the warm water circuit 13 and the cool water circuit 14 so that the degassing can be performed with high efficiency.

In the present embodiment, when the specified time elapses after the reserve tank 47 comes in communication with at least one cooling water circuit (referred to as a specified cooling water circuit hereafter) of the cooling water circuits 11-14, the controller 60 controls the first to fourth inlet valves 51A-51D and the first to fourth outlet valves 52A-52D to allow the reserve tank 47 to come in communication with an other cooling water circuit of the cooling water circuits 11-14 other than the specified cooling water circuit.

As a result, the degassing can be performed in the cooling water circuits 11-14 in series.

Specifically, the controller 60 selects, as the cooling water circuit other than the specified cooling water circuit, one of the cooling water circuits 11-14 through which the cooling water, which has a temperature closest to a temperature of the heat medium flowing through the specified cooling water circuit, flows. As a result, the heat loss can be minimized even when the cooling water mixes at the time of switching.

In the present embodiment, the controller 60 increases the specified time as a temperature of the cooling water (or the heat medium) flowing through the specified cooling water circuit rises. As such, the degassing can be performed certainly in the cooling water circuit, which is given the priority on the degassing since the temperature of the cooling water circulating therethrough is high.

In the present embodiment, the controller 60 increases the specified time as a flow rate of the cooling water (or the heat medium) flowing through the specified cooling water circuit increases. As such, the degassing can be performed certainly in the cooling water circuit, which is given the priority on the degassing since a flow rate of the cooling water circulating therethrough is large.

In the present embodiment, the controller 60 controls an operation of the first to fourth inlet valves 51A-51D and the first to fourth outlet valves 52A-52D to allow the reserve tank 47 to come in communication with a cooling water circuit of the plurality of cooling water circuits that mounts the pump determined to be idling.

As such, the degassing can be performed certainly in the cooling water circuit, which is given the priority on the degassing since the pump idles with large amount of air.

In the present embodiment, when relationships in temperature among the cooling water circuits changes, the controller 60 controls the first to fourth inlet valves 51A-51D and the first to fourth outlet valves 52A-52D to allow the reserve tank 47 to come in communication with a cooling water circuit of the cooling water circuits through which the cooling water having the highest temperature among the cooling water circuits flows.

As such, the degassing can be performed preferentially in the cooling water circuit, which is given the priority on the degassing since the temperature of the cooling water circulating therethrough is high.

In the present embodiment, the controller 60 controls an operation of the first to fourth inlet valves 51A-51D and the first to fourth outlet valves 52A-52D to allow the reserve tank 47 to come in communication with a cooling water circuit of the cooling water circuits, through which the cooling water flows with the largest flow rate among the cooling water circuits, when relationships in a flow rate among the cooling water circuits changes.

As such, the degassing can be performed preferentially in the cooling water circuit, which is given the priority on the degassing since a flow rate of the cooling water circulating therethrough is high.

Second Embodiment

In the above-described embodiment, a connection target circuit to be connected with the reserve tank 47 is set by operating the first to fourth inlet valves 51A-51D and the first to fourth outlet valves 52A-52D. In the present embodiment, the connection target circuit is set by operating a first to fifth valve 41-45.

That is, in the present embodiment, the first to fifth switching valves 41-45 serve as a connector that allows the reserve tank 47 to come in communication with the cooling water circuits 11-14 selectively.

In the present embodiment, the second switching valve 42 is a four-way valve including four ports. The second-circuit outlet pipe 49b of the outlet pipe 49 is connected to a fourth port 42d of the second switching valve 42.

In the present embodiment, the fourth switching valve 44 is a four-way valve including four ports. The third-circuit inlet pipe 48c of the inlet pipe 48 is connected to the fourth port 44d of the fourth switching valve 44.

In the present embodiment, the fifth switching valve 45 is a four-way valve including four ports. The third-circuit outlet pipe 49c of the outlet pipe 49 is connected to a fourth port 45d of the fifth switching valve 45.

When connecting the reserve tank 47 to the engine circuit 11, the first switching valve 41 and the second switching valve 42 shut off a communication between the engine circuit 11 and the heater circuit 12. When the thermostat 24 opens the cooling water passage adjacent to the radiator 23 so that the cooling water flows into the radiator 23, the cooling water circulates between the engine circuit 11 and the reserve tank 47. As such, the degassing can be performed in the engine circuit 11.

When connecting the reserve tank to the heater circuit 12, the first switching valve 41, the second switching valve 42, and the third switching valve 43 separate the heater circuit 12 from the engine circuit 11 and the warm water circuit 13, and the second switching valve 42 opens the second-circuit outlet pipe 49b of the outlet pipe 49. As a result, the cooling water circulates between the heater circuit 12 and the reserve tank 47, therefore the degassing can be performed in the heater circuit 12.

When connecting the reserve tank 47 to the warm water circuit 13, (i) the third switching valve 43, the fourth switching valve 45, and the fifth switching valve 45 separate the warm water circuit 13 from the heater circuit 12 and the cool water circuit 14, (ii) the fourth switching valve 44 allows the warm water circuit 13 to come in communication with the third-circuit inlet pipe 48c of the inlet pipe 48, and (iii) the fifth switching valve 45 allows the warm water circuit 13 to come in communication with the third-circuit outlet pipe 49c of the outlet pipe 49. As a result, the cooling water circulates between the warm water circuit 13 and the reserve tank 47, therefore the degassing can be performed in the warm water circuit 13.

When connecting the reserve tank 47 to the cool water circuit 14, (i) the fourth switching valve 45 and the fifth switching valve 45 separate the cool water circuit 14 from the warm water circuit 13, (ii) the fourth switching valve 44 allows the cool water circuit 14 to come in communication with the third-circuit inlet pipe 48c of the inlet pipe 48, and (iii) the fifth switching valve 45 allows the cool water circuit 14 to come in communication with the third-circuit outlet pipe 49c of the outlet pipe 49. As a result, the cooling water circulates between the cool water circuit 14 and the reserve tank 47, therefore the degassing can be performed in the cool water circuit 14.

When connecting the reserve tank 47 to engine circuit 11 and the heater circuit 12, (i) the first switching valve 41 and the second switching valve 42 allow the engine circuit 11 and the heater circuit 12 to come in communication with each other, (ii) the third switching valve 43 separates the engine circuit 11 and the heater circuit 12 from the warm water circuit 13, and (iii) the second switching valve 42 opens the second-circuit outlet pipe 49b of the outlet pipe 49. As a result, the cooling water circulates between the engine circuit 11 and the reserve tank 47 and between the heater circuit 12 and the reserve tank 47, the degassing can be performed in the engine circuit 11 and the heater circuit 12.

When connecting the reserve tank 47 to the engine circuit 11, the heater circuit 12, and the warm water circuit 13, (i) the first switching valve 41, the second switching valve 42, and the third switching valve 43 allow the engine circuit 11, the heater circuit 12, and the warm water circuit 13 to come in communication with each other, (ii) the second switching valve 42 opens the second-circuit outlet pipe 49b of the outlet pipe 49, (iii) the fourth switching valve 44 and the fifth switching valve 45 separate the warm water circuit 13 from the cool water circuit 14, (iv) the fourth switching valve 44 allows the warm water circuit 13 to come in communication with the third-circuit inlet pipe 48c of the inlet pipe 48, and (v) the fifth switching valve 45 allows the warm water circuit 13 to come in communication with the third-circuit outlet pipe 49c of the outlet pipe 49.

As a result, the cooling water circulates between the reserve tank 47 and respective one of the engine circuit 11, the heater circuit 12, and the warm water circuit 13, the degassing can be performed in the engine circuit 11, the heater circuit 12, and the warm water circuit 13.

When connecting the reserve tank 47 to the engine circuit 1, the heater circuit 12, the warm water circuit 13, and the cool water circuit 14 (i) the third switching valve 43, the fourth switching valve 44, and the fifth switching valve 45 allow the engine circuit 11, the heater circuit 12, the warm water circuit 13, and the cool water circuit 14 to come in communication with each other, (ii) the second switching valve 42 opens the second-circuit outlet pipe 49b of the outlet pipe 49, (iii) the fourth switching valve 44 allows the warm water circuit 13 and the cool water circuit 14 to come in communication with the third-circuit inlet pipe 48c of the inlet pipe 48, and (iv) the fifth switching valve 45 allows the warm water circuit 13 and the cool water circuit 14 to come in communication with the third-circuit outlet pipe 49c of the outlet pipe 49.

As a result, the cooling water circulates between the reserve tank 47 and respective one of the engine circuit 11, the heater circuit 12, the warm water circuit 13, and the cool water circuit 14, the degassing can be performed in the engine circuit 11, the heater circuit 12, the warm water circuit 13, and the cool water circuit 14.

When connecting the reserve tank 47 to the heater circuit 12 and the warm water circuit 13, (i) the third switching valve 43 allows the heater circuit 12 and the warm water circuit 13 to come in communication with each other, (ii) the first switching valve 41, the second switching valve 42, the fourth switching valve 44, and the fifth switching valve 45 separate the heater circuit 12 and the warm water circuit 13 from the engine circuit 11 and the cool water circuit 14, (iii) the second switching valve 42 opens the second-circuit outlet pipe 49b of the outlet pipe 49, (iv) the fourth switching valve allows the warm water circuit 13 to come in communication with the third-circuit inlet pipe 48c of the inlet pipe 48, and (v) the fifth switching valve 45 allows the warm water circuit 13 to come in communication with the third-circuit outlet pipe 49c of the outlet pipe 49.

As a result, the cooling water circulates between the reserve tank 47 and each of the heater circuit 12 and the warm water circuit 13, the degassing can be performed in the heater circuit 12 and the warm water circuit 13.

When connecting the reserve tank 47 to the heater circuit 12, the warm water circuit 13, and the cool water circuit 14 (i) the third switching valve 43, the fourth switching valve 44, and the fifth switching valve 45 allow the heater circuit 12, the warm water circuit 13, and the cool water circuit 14 to come in communication with each other, (ii) the first switching valve 41 and the second switching valve 42 shut off a communication between the heater circuit 12 and the engine circuit 11, (iii) the second switching valve 42 opens the second-circuit outlet pipe 49b of the outlet pipe 49, (iv) the fourth switching valve 44 allows the warm water circuit 13 and the cool water circuit 14 to come in communication with the third-circuit inlet pipe 48c of the inlet pipe 48, and (v) the fifth switching valve 45 allows the warm water circuit 13 and the cool water circuit 14 to come in communication with the third-circuit outlet pipe 49c of the outlet pipe 49.

As a result, the cooling water circulates between the reserve tank 47 and respective one of the heater circuit 12, the warm water circuit 13, and the cool water circuit 14, the degassing can be performed in the heater circuit 12, the warm water circuit 13, and the cool water circuit 14.

When connecting the reserve tank 47 to the warm water circuit 13 and the cool water circuit 14, (i) the fourth switching valve 44 and the fifth switching valve 45 allow the warm water circuit 13 and the cool water circuit 14 to come in communication with each other, (ii) the third switching valve 43 shuts off a communication between the warm water circuit 13 and the cool water circuit 14, (iii) the fourth switching valve 44 allows the warm water circuit 13 and the cool water circuit 14 to come in communication with the third-circuit outlet pipe 49c of the outlet pipe 49, and (iv) the fifth switching valve 45 allows the warm water circuit 13 and the cool water circuit 14 to come in communication with the third-circuit outlet pipe 49c of the outlet pipe 49.

As a result, the cooling water circulates between the reserve tank 47 and each of the warm water circuit 13 and the cool water circuit 14, the degassing can be performed in the warm water circuit 13 and the cool water circuit 14.

In the present embodiment, the switching valves 41-45 shut off the transmission of pressure among the cooling water circuits 11-14 so that the reserve tank 47 is in communication with the cooling water circuits 11-14 selectively.

Accordingly, in a manner similar to the above-described first embodiment, it is possible to switch the connection target circuit of the reserve tank 47 according to various scenes.

OTHER EMBODIMENTS

Although preferred embodiments of the present disclosure have been described above, the present disclosure is not limited to the above-described embodiments, and various modifications are contemplated as exemplified below. It should be understood that the structures described in the above-described embodiments are example structures, and the present disclosure is not limited to the foregoing descriptions. The present disclosure is intended to cover various modification and equivalent arrangements.

(1) In the above-described embodiments, the exhaust heat recovery device 22 is disposed in the engine circuit 11. However, the exhaust heat recovery device 22 may be disposed in the heater circuit 12.

In the above configuration, when the following conditions (i) and (ii) are satisfied, the temperature difference between temperatures of the cooling water in the engine circuit 11 and the heater circuit 12 becomes small. Thus, the controller 60 connects the reserve tank 47 to the engine circuit 11 and the heater circuit 12.

(i) A condition where a temperature of the cooling water in the exhaust heat recovery device 22 and a temperature of the cooling water in the engine circuit 11 are close to each other while the heating operation is performed using the exhaust heat recovered by the exhaust heat recovery device 22.

(ii) A condition where a temperature of the cooling water in the exhaust heat recovery device 22 is higher than the target temperature THO of the heater core 28 while the heating operation is performed using the exhaust heat recovered by the exhaust heat recovery device 22. In this case, the exhaust heat recovered by the exhaust heat recovery device 22 can be discharged to the engine 21. As such, even when the reserve tank 47 is connected to the engine circuit 11 and the heater circuit 12 and the heat loss occurs, the heat loss may have no impact.

When the air mix door is in a maximum heating state, it can be determined that the temperature of the cooling water in the exhaust heat recovery device 22 is higher than the target temperature THO of the heater core 28.

(2) In the above embodiments, the plurality of circuit inlet pipes 48a, 48b, 48c, 48d, which are connected to the cooling water circuits 11-14 respectively, are collected into the single common inlet pipe 48e and connected to the single cooling water inlet of the reserve tank 47. However, the reserve tank 47 may include a plurality of cooling water inlets. In this case, the plurality of circuit inlet pipes, which are connected to the cooling water circuits 11-14 respectively, may be connected to the plurality of cooling water inlets of the reserve tank 47 respectively in parallel without the circuit inlet pipes of the cooling water circuits 11-14 are not collected.

Similarly, the plurality of circuit outlet pipes 49a, 49b, 49c, 49d, which are connected to the cooling water circuits 11-14 respectively, are collected into the single common inlet pipe 48e and connected to the single cooling water outlet of the reserve tank 47. However, the reserve tank 47 may include a plurality of cooling water outlets. In this case, the plurality of circuit outlet pipes, which are connected to the cooling water circuits 11-14 respectively, may be connected to the plurality of cooling water outlets of the reserve tank 47 respectively in parallel without the circuit outlet pipes of the cooling water circuits 11-14 are not collected.

(3) In the above embodiments, the cooling water is used as the heat medium flowing through the cooling water circuits 11-14. However, various mediums, such as oil, may be used as the heat medium.

The heat medium may be nanofluid. A nanofluid is a fluid in which nanoparticles having a particle diameter in the order of nanometers are mixed. When nanoparticles are mixed into the heat medium, the following effects can be obtained in addition to an effect of reducing a freezing point of the cooling water containing ethylene glycol (so-called anti-freezing liquid).

That is, the heat conductivity in a specified temperature range can be improved, the heat capacity of the heat medium can be increased, the anticorrosive effect of the metal pipe and the deterioration of the rubber pipe can be improved, and the flowability of the heat medium in extremely low temperature environment can be improved.

Such effects may vary according to a particle structure, a particle shape, a ratio of combination, and an additional material in the nanoparticles.

As such, the thermal conductivity can be improved. Therefore, a similar cooling efficiency can be obtained with a smaller amount of heat medium than the cooling water containing ethylene glycol.

Further, since the heat capacity of the heat medium can be increased, the amount of cold heat stored in the heat medium itself can be increased. The amount of cold heat stored in the heat medium itself may mean an amount of cold heat stored by sensible heat.

By increasing the amount of the stored cold heat, it is possible to perform a temperature regulation in cooling or heating of a device using the stored cold heat for a certain time even when the compressor is not in operation. As such, power saving in the thermal management device 10 for a vehicle can be achieved.

The aspect ratio of the nanoparticles may be 50 or more preferably to obtain a sufficient thermal conductivity. The aspect ratio is a shape index that indicates the ratio between vertical and horizontal sizes of the nanoparticle.

The nanoparticle may contain at least one of Au, Ag, Cu, or C. Specifically, as a constituent atom of the nanoparticle, an Au nanoparticle, an Ag nanowire, CNT, graphene, a graphite core shell nanoparticle, or an Au nanoparticle-containing CNT may be used. CNT is a carbon nanotube. A graphite core shell nanoparticle is a particle body including a structure such as carbon nanotube surrounding the atom.

(4) In the refrigeration circuit in the above-described embodiments, a fluorocarbon refrigerant is used as the refrigerant. However, the refrigerant may not be limited to being the fluorocarbon refrigerant. A natural refrigerant such as carbon dioxide or a hydrocarbon refrigerant may be used.

(5) In the above-described embodiments, the refrigeration circuit is a subcritical refrigeration circuit in which the pressure of the high-pressure refrigerant does not exceed the critical pressure of the refrigerant. However, the refrigeration circuit may be a supercritical refrigeration circuit in which the pressure of the high-pressure refrigerant possibly exceeds the critical pressure of the refrigerant.

What is claimed is:

1. A thermal management device for a vehicle comprising:
   a plurality of heat medium circuits that allow a heat medium to circulate therethrough separately;
   a reserve tank that is configured to separate an air bubble contained in the heat medium from the heat medium;
   a connector that allows the reserve tank to come in communication with the plurality of heat medium circuits selectively depending on degrees of heat loss in the plurality of heat medium circuits; and
   a controller that controls an operation of the connector, wherein
   when a specified time elapses after the reserve tank comes in communication with at least one heat medium circuit of the plurality of heat medium circuits, the controller controls the connector to allow the reserve tank to come in communication with an other heat medium circuit of the plurality of heat medium circuits other than the at least one heat medium circuit.

2. The thermal management device for a vehicle according to claim 1, wherein
   the controller is further configured to
      determine whether a temperature difference of the heat medium between at least two heat medium circuits of the plurality of heat medium circuits is within a specified range, and
      control the connector to allow the reserve tank to come in communication with the at least two heat medium circuits upon determining the temperature difference of the heat medium is within the specified range.

3. The thermal management device for a vehicle according to claim 1, further comprising:
   a heat medium cooling heat exchanger that is configured to cool the heat medium; and
   a cool-heat-medium heat exchanger that is configured to exchange heat with the heat medium cooled in the heat medium cooling heat exchanger, wherein
   one of the plurality of heat medium circuits is a cool heat medium circuit that allows the heat medium, which is cooled in the heat medium cooling heat exchanger, to circulate therethrough, and
   the controller, in a cooling operation in which the cool-heat-medium heat exchanger performs the heat exchange, controls the connector to operate
      an operation mode in which the reserve tank is in communication with the plurality of heat medium circuits other than the cool heat medium circuit and
      an operation mode in which the reserve tank is in communication with the cool heat medium circuit.

4. The thermal management device for a vehicle according to claim 3, wherein
   the cool-heat-medium heat exchanger is an air cooling heat exchanger that is configured to perform a heat exchange between the heat medium, which is cooled in the heat medium cooling heat exchanger, and air, which is supplied to a vehicle compartment, thereby cooling the air.

5. The thermal management device for a vehicle according to claim 1, further comprising:
   a heat-medium heating heat exchanger that is configured to heat the heat medium; and
   a warm-heat-medium heat exchanger that is configured to exchange heat with the heat medium heated in the heat-medium heating heat exchanger, wherein
   one of the plurality of heat medium circuits is a warm heat medium circuit that allows the heat medium, which is heated in the heat-medium heating heat exchanger, to circulate therethrough, and
   the controller, in a heating operation in which the warm-heat-medium heat exchanger performs the heat exchange, controls the connector to operate
      an operation mode in which the reserve tank is in communication with the plurality of heat medium circuits other than the warm heat medium circuit and
      an operation mode in which the reserve tank is in communication with the warm heat medium circuit.

6. The thermal management device for a vehicle according to claim 5, wherein
   the warm-heat-medium heat exchanger is an air heating heat exchanger that is configured to perform a heat exchange between the heat medium, which is heated in the heat-medium heating heat exchanger, and air, which is supplied to the vehicle compartment, thereby heating the air.

7. The thermal management device for a vehicle according to claim 1, further comprising
   a pipe that defines a passage therein allowing the heat medium to flow therethrough and connects the reserve tank to each of the plurality of the heat medium circuits, wherein
   the connector includes a switching valve that is configured to open and close the passage of the pipe.

8. The thermal management device for a vehicle according to claim 1, further comprising
   a pipe that defines a passage therein allowing the heat medium to flow therethrough and connects the reserve tank to each of the plurality of the heat medium circuits, wherein
   the connector includes a shutoff valve that is configured to shutoff a transmission of a pressure among the plurality of heat medium circuits.

9. The thermal management device for a vehicle according to claim 1, further comprising
   a pipe that defines a passage therein allowing the heat medium to flow therethrough and that connects the reserve tank to the plurality of heat medium circuits, wherein
   the pipe includes
      a common pipe that is connected to the reserve tank and
      a plurality of circuit pipes that branch from the common pipe toward the plurality of heat medium circuits,
   the plurality of heat medium circuits include
      a high-temperature heat medium circuit through which the heat medium in a high-temperature range flows and
      a low-temperature heat medium circuit through which the heat medium in a low-temperature range flows,
   the plurality of circuit pipes includes one circuit pipe connected to the high-temperature heat medium circuit and an other circuit pipe connected the low-temperature heat medium circuit, and
   the one circuit pipe is arranged closer to the reserve tank than the other circuit pipe.

10. The thermal management device for a vehicle according to claim 1, further comprising
    a pipe that defines a passage therein allowing the heat medium to flow therethrough and that connects the reserve tank to the plurality of heat medium circuits, wherein the pipe includes
  a common pipe and
  a plurality of circuit pipes that branch from the common pipe toward the plurality of heat medium circuits,
the plurality of heat medium circuits include
  a high-temperature heat medium circuit through which the heat medium in a high-temperature range flows and
  a low-temperature heat medium circuit through which the heat medium in a low-temperature range flows,
the plurality of circuit pipes includes one circuit pipe connected to the high-temperature heat medium circuit and an other circuit pipe connected the low-temperature heat medium circuit, and
the one circuit pipe has an inner diameter that is greater than an inner diameter of the other circuit pipe.

11. The thermal management device for a vehicle according to claim 1, further comprising:
  a blower that is configured to blow air into a vehicle compartment; and
  an air-conditioning heat exchanger that is configured to perform a heat exchange between air blown by the blower and the heat medium, wherein
  the controller controls an operation of the connector to allow the reserve tank to come in communication with all of the plurality of heat medium circuits when the blower is stopped.

12. The thermal management device for a vehicle according to claim 1, wherein
  the controller controls an operation of the connector to allow the reserve tank to come in communication with all of the plurality of heat medium circuits when the vehicle starts moving or after being stopped.

13. The thermal management device for a vehicle according to claim 1, further comprising
  a high-temperature heat medium circuit that is one of the plurality of heat medium circuits and that allows the heat medium in a high temperature range to flow therethrough;
  a low-temperature heat medium circuit that is one of the plurality of heat medium circuits and that allows the heat medium in a low temperature range to flow therethrough;
  an air heating heat exchanger that is mounted to the high-temperature heat medium circuit and that is configured to perform a heat exchange between the heat medium and air supplied to a vehicle compartment thereby heating the air supplied to the vehicle compartment; and
  an air cooling heat exchanger that is mounted to the low-temperature heat medium circuit and that is configured to perform a heat exchange between the heat medium and air supplied to a vehicle compartment thereby cooling the air supplied to the vehicle compartment, wherein
  the controller controls the operation of the connector to allow the reserve tank to come in communication with the high-temperature heat medium circuit and the low-temperature heat medium circuit in a heating operation with no dehumidification request or in a dehumidification heating operation with the heat medium in the low-temperature heat medium circuit having a temperature lower than a target temperature of the air cooling heat exchanger and with the heat medium in the high-temperature heat medium circuit having a temperature higher than a target temperature of the air heating heat exchanger.

14. The thermal management device for a vehicle according to claim 1, further comprising
  a high-temperature heat medium circuit that is one of the plurality of heat medium circuits and that allows the heat medium in a high temperature range to flow therethrough;
  a low-temperature heat medium circuit that is one of the plurality of heat medium circuits and that allows the heat medium in a low temperature range to flow therethrough;
  a waste-heat supplying device that is mounted to the high-temperature heat medium circuit and supplies waste heat to the heat medium; and
  an air cooling heat exchanger that is mounted to the low-temperature heat medium circuit and that is configured to perform a heat exchange between the heat medium and air supplied to a vehicle compartment thereby cooling the air supplied to the vehicle compartment, wherein
  the controller controls the operation of the connector to allow the reserve tank to come in communication with the high-temperature heat medium circuit and the low-temperature heat medium circuit (i) in a cooling operation with small amount of the waste heat from the waste-heat supplying device, (ii) in a dehumidification heating operation with the air cooling heat exchanger having a temperature lower than a dew point of the air flowing into the air cooling heat exchanger, or (iii) in a condition where the temperature of the air cooling heat exchanger is lower than a freezing point.

15. The thermal management device for a vehicle according to claim 1, wherein
  the controller selects, as the other heat medium circuit other than the at least one heat medium circuit, one of the plurality of heat medium circuits through which the heat medium, which has a temperature closest to a temperature of the heat medium flowing through the at least one heat medium circuit, flows.

16. The thermal management device for a vehicle according to claim 1, wherein
  the controller increases the specified time as a temperature of the heat medium flowing through the at least one heat medium circuit rises.

17. The thermal management device for a vehicle according to claim 1, wherein
  the controller increases the specified time as a flow rate of the heat medium flowing through the at least one heat medium circuit increases.

18. The thermal management device for a vehicle according to claim 1, further comprising
  a pump that is mounted to the plurality of heat medium circuits and is configured to draw and discharge the heat medium, wherein
  the controller controls an operation of the connector to allow the reserve tank to come in communication with a heat medium circuit of the plurality of heat medium circuits that mounts the pump determined to be idling.

19. The thermal management device for a vehicle according to claim 1, wherein
  the controller controls an operation of the connector to allow the reserve tank to come in communication with a heat medium circuit of the plurality of heat medium circuits, through which the heat medium having a highest temperature among the plurality of heat medium circuits flows, when relationships in temperature among the plurality of heat medium circuits changes.

20. The thermal management device for a vehicle according to claim 1, wherein
the controller controls an operation of the connector to allow the reserve tank to come in communication with a heat medium circuit of the plurality of heat medium circuits, through which the heat medium flows with a largest flow rate among the plurality of heat medium circuits, when relationships in a flow rate among the plurality of heat medium circuits changes.

* * * * *